United States Patent
Kim et al.

(10) Patent No.: US 10,763,682 B2
(45) Date of Patent: Sep. 1, 2020

(54) ENERGY STORAGE SYSTEM AND CONTROLLING METHOD THEREOF

(71) Applicant: SAMSUNG SDI CO., LTD., Yongin-si, Gyeonggi-do (KR)

(72) Inventors: Jang-Hoon Kim, Yongin-si (KR); Jung-Pil Park, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 313 days.

(21) Appl. No.: 14/618,954

(22) Filed: Feb. 10, 2015

(65) Prior Publication Data
US 2015/0255999 A1 Sep. 10, 2015

(30) Foreign Application Priority Data
Mar. 4, 2014 (KR) .................. 10-2014-0025368

(51) Int. Cl.
*H02J 7/00* (2006.01)
*H02J 3/32* (2006.01)
*H02J 9/06* (2006.01)

(52) U.S. Cl.
CPC .......... *H02J 7/007* (2013.01); *H02J 3/32* (2013.01); *H02J 7/0013* (2013.01); *H02J 7/0014* (2013.01); *H02J 7/0029* (2013.01); *H02J 7/0042* (2013.01); *H02J 9/062* (2013.01)

(58) Field of Classification Search
USPC ...................................................... 320/134
See application file for complete search history.

(56) References Cited

U.S. PATENT DOCUMENTS

| | | | |
|---|---|---|---|
| 2005/0001593 A1* | 1/2005 | Kawasumi | H02J 7/0013 320/132 |
| 2012/0091965 A1* | 4/2012 | Seo | G06F 1/26 320/128 |
| 2012/0091967 A1* | 4/2012 | Kawamoto | H02J 3/32 320/134 |

(Continued)

FOREIGN PATENT DOCUMENTS

| | | |
|---|---|---|
| CN | 102457066 A | 5/2012 |
| EP | 2 802 053 A1 | 11/2014 |

(Continued)

OTHER PUBLICATIONS

EPO Search Report dated Jul. 30, 2015, for corresponding European Patent application 15157048.8, (7 pages).

(Continued)

*Primary Examiner* — Samuel Berhanu
(74) *Attorney, Agent, or Firm* — Lewis Roca Rothgerber Christie LLP (57) ABSTRACT

An energy storage system includes a power conversion system configured to produce a control signal for regulating a frequency of power flowing from a power generation system to an electric-power system, and a battery system including a first battery rack, a second battery rack, a charger/discharger configured to perform a charging/discharging operation of the second battery rack, and a rack BMS configured to control the charging/discharging operation of the first and second battery racks using the control signal, and to control the charger/discharger, thus controlling a state of charge (SOC) of the second battery rack.

19 Claims, 6 Drawing Sheets

(56) References Cited

U.S. PATENT DOCUMENTS

2012/0176094 A1* 7/2012 Okuda ............... H01M 10/441
                                                    320/134
2012/0248873 A1  10/2012 Oudalov et al.
2014/0365027 A1* 12/2014 Namba .................... H02J 3/32
                                                    700/297

FOREIGN PATENT DOCUMENTS

KR   10-2012-0110478 A   10/2012
KR   10-2013-0074048 A   7/2013
KR   10-2013-0102681 A   9/2013
WO   WO 2013/103011 A1   7/2013

OTHER PUBLICATIONS

EPO Office action dated Apr. 20, 2016, for corresponding European Patent application 15157048.8, (5 pages).
SIPO Office Action, with English translation, dated May 30, 2018, for corresponding Chinese Patent Application No. 201510094844.1 (22 pages).
Chinese Notification of the Second Office Action, for Patent Application No. 201510094844.1, dated Feb. 22, 2019, 8 pages.
Partial English translation of the Chinese Notification of the Second Office Action, for Patent Application No. 201510094844.1, dated Feb. 22, 2019, 18 pages.
Chinese Intellectual Property Office Decision of Rejection with English Translation for corresponding Chinese Patent Application No. 201510094844.1, dated Jul. 1, 2019, 22 pages.
India Intellectual Property Office Action with English Translation for corresponding Indian Application No. 599/DEL/2015, dated Sep. 24, 2019, 6 pages.

* cited by examiner

FIG. 6A
main 60Ah 2C battery SoC

FIG. 6B

ENERGY STORAGE SYSTEM AND CONTROLLING METHOD THEREOF

CROSS-REFERENCE TO RELATED APPLICATION

This application claims priority to and the benefit of Korean Patent Application No. 10-2014-0025368, filed on Mar. 4, 2014, in the Korean Intellectual Property Office, the entire contents of which are incorporated herein by reference in their entirety.

BACKGROUND

1. Field

Embodiments of the present invention relate to an energy storage system and a controlling method thereof, and, more particularly, to an energy storage system and a controlling method thereof, which enables the frequency of power flowing in an electric-power system to be continuously regulated.

2. Description of the Related Art

As environmental destruction and resource exhaustion are becoming a serious problem, there is a rising interest in a system that may store energy and efficiently utilize the stored energy. Likewise, there is a rising interest in new renewable energy that never or scarcely causes pollution (e.g., causes little pollution) during power generation. An energy storage system may be a system that uses the new renewable energy, a battery system and an existing electric-power system in conjunction with each other.

Such an energy storage system is configured to include a battery system that stores power, a power conversion system that properly converts power of the battery system, a power generation system, and an electric-power system. The energy storage system then supplies the converted power.

When the electric-power system is in an abnormal state, for example, a power failure occurs, the energy storage system may perform an uninterruptible power supply (UPS) operation. Further, when the frequency is changed depending on a change in consumption of power flowing in the electric-power system, the energy storage system may perform frequency regulation to maintain a desired frequency by charging or discharging power stored in the battery system, thus allowing a frequency to be kept constant or substantially constant.

When the energy storage system is operated to regulate the frequency, it is required to continuously and randomly charge or discharge the battery system. However, when the battery system comes into a full charge state or a full discharge state due to the accumulation of the charging or discharging operations, the charging or discharging operation may be stopped. In this case, the state of charge (SOC) of the battery system should be regulated to 50% again and then the charging or discharging operation to perform the frequency regulation may resume, thus causing an inconvenience.

SUMMARY

According to an embodiment of the present invention, there is provided an energy storage system including a power conversion system configured to produce a control signal for regulating a frequency of power flowing from a power generation system to an electric-power system; and a battery system including a first battery rack, a second battery rack, a charger/discharger configured to perform a charging/discharging operation of the second battery rack; and a rack battery management system (BMS) configured to control the charging/discharging operation of the first and second battery racks using the control signal, and to control the charger/discharger, thus controlling a state of charge (SOC) of the second battery rack.

The control signal may include a charge control signal causing the power to be charged into the first or second battery rack when the frequency of the power flowing in the electric-power system exceeds a set value, and a discharge control signal causing the first or second battery rack to be discharged, thus supplying power to the electric-power system when the frequency of the power flowing in the electric-power system is less than the set value.

When the control signal is the charge control signal, the rack BMS may perform control such that the power is charged into the first battery rack when a state of charge of the first battery rack is less than a first state of charge, and may perform control such that the power is charged into the second battery rack when the state of charge of the first battery rack is equal to or more than the first state of charge.

When the state of charge of the second battery rack increases to exceed a second state of charge and the power is being charged into the second battery rack, the rack BMS may control the charger/discharger to discharge the second battery rack such that the state of charge of the second battery rack maintains the second state of charge.

When the first battery rack is charged or discharged in response to the control signal, the rack BMS may control the charger/discharger such that the state of charge of the second battery rack has a fifth state of charge.

The fifth state of charge may be about 50%.

When the control signal is the discharge control signal, the rack BMS may perform control such that the first battery rack is discharged when a state of charge of the first battery rack is more than a third state of charge, and may perform control such that the second battery rack is discharged when the state of charge of the first battery rack is equal to or less than the third state of charge.

When the state of charge of the second battery rack is less than a fourth state of charge and the second battery rack is being discharged, the rack BMS may control the charger/discharger to charge the second battery rack such that the state of charge of the second battery rack maintains the fourth state of charge.

When the first battery rack is charged or discharged in response to the control signal, the rack BMS may control the charger/discharger such that the state of charge of the second battery rack has a fifth state of charge.

The fifth state of charge may be about 50%.

A maximum rated discharge of the second battery rack may be larger than a maximum rated discharge of the first battery rack.

According to another embodiment of the present invention, there is provided a method of controlling an energy storage system, the energy storage system including a battery system having a first battery rack, a second battery rack, a charger/discharger configured to charge or discharge the second battery rack; and a power conversion system configured to transmit a control signal for regulating a frequency of power flowing from a power generation system to an electric-power system and for regulating a frequency of power flowing from the battery system to the electric-power system, the method including determining a priority of charging/discharging the first battery rack or the second battery rack using the control signal and a state of charge of the first battery rack; charging/discharging the first battery rack or the second battery rack to regulate the frequency depending on the determined priority; and controlling a state of charge of the second battery rack to be a set state of charge using the charger/discharger.

The control signal may include a charge control signal causing the power to be charged into the first or second battery rack when the frequency of the power flowing in the electric-power system exceeds a set value; and a discharge control signal causing the first or second battery rack to be discharged, thus supplying power to the electric-power system when the frequency of the power flowing in the electric-power system is less than the set value.

When the control signal is the charge control signal, at the determining of the priority, the priority may be determined such that: when the state of charge of the first battery rack is less than a first state of charge, the power is charged into the first battery rack, and when the state of charge of the first battery rack is equal to or more than the first state of charge, the power is charged into the second battery rack.

When the state of charge of the second battery rack exceeds a second state of charge, at controlling of the state of charge of the second battery, the charger/discharger may be controlled such that the second battery rack is discharged and the state of charge of the second battery rack maintains the second state of charge.

When the control signal is the discharge control signal, at the determining of the priority, the priority may be determined such that: when the state of charge of the first battery rack is more than a third state of charge, the first battery rack is discharged, and when the state of charge of the first battery rack is equal to or less than the third state of charge, the second battery rack is discharged.

When the state of charge of the second battery rack is less than a fourth state of charge, at controlling of the state of charge of the second battery, the charger/discharger may be controlled such that the second battery rack is charged and the state of charge of the second battery rack maintains the fourth state of charge.

When the first battery rack is charged or discharged, at controlling of the state of charge of the second battery, the charger/discharger may be controlled such that the state of charge of the second battery rack has a fifth state of charge.

The fifth state of charge may be about 50%.

A maximum rated discharge of the second battery rack may be larger than a maximum rated discharge of the first battery rack.

According to embodiments of the present invention, it is possible to continuously carry out a charging/discharging operation of a battery system in a way that regulates a frequency in an energy storage system.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

In the following detailed description, certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive.

In addition, when an element is referred to as being "on" another element, it can be directly on the another element or be indirectly on the another element with one or more intervening elements interposed therebetween. Also, when an element is referred to as being "connected to" or "coupled to" another element, it can be directly connected to or coupled to the another element or be indirectly connected to or coupled to the another element with one or more intervening elements interposed therebetween. Hereinafter, like reference numerals refer to like elements.

As used herein, the term "and/or" includes any and all combinations of one or more of the associated listed items.

Hereinafter, embodiments of the present invention will be described with reference to the accompanying drawings.

Figure 1:
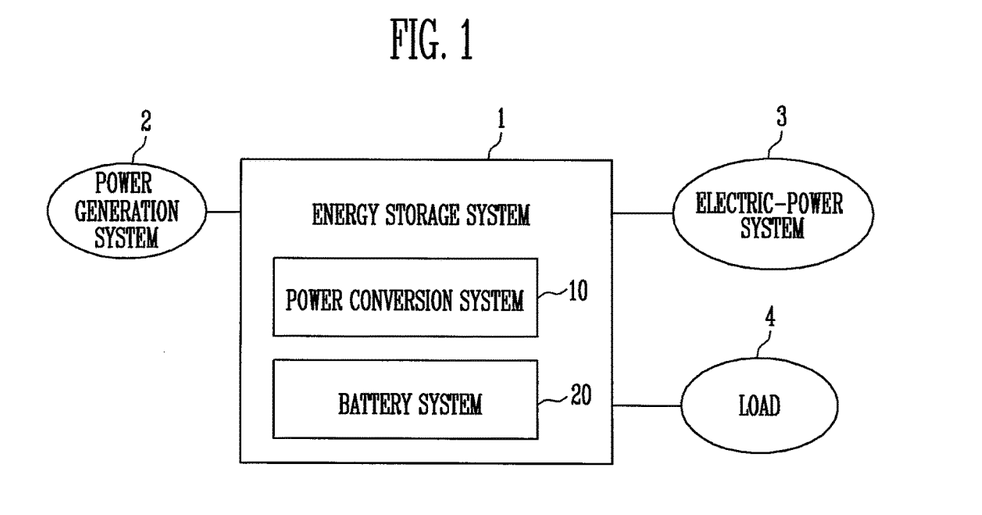
FIG. 1 is a diagram schematically showing an energy storage system and peripheral components thereof according to an embodiment of the present invention.

FIG. 1 is a diagram schematically showing an energy storage system and peripheral components thereof according to an embodiment of the present invention.

Referring to FIG. 1, the energy storage system 1 according to this embodiment is configured to supply power to a load 4, in conjunction with a power generation system 2 and an electric-power system 3.

The power generation system 2 is a system that produces power using an energy source. The power generation system 2 is configured to supply produced power to the energy storage system 1. The power generation system 2 may be a solar-light power generation system, a wind power generation system, a tidal power generation system, etc. However, these are to be regarded as illustrative only, and as such the power generation system 2 is not limited thereto. The power generation system 2 may also include all other suitable kinds of power generation systems that produce power (e.g., power generation systems that produce power using renewable energy such as solar heat or geothermal heat). For example, since it is easy to install a solar cell configured to produce electrical energy using solar-light in a home, a factory, etc., the solar cell is suitable for the energy storage system 1 in the home or factory. The power generation system 2 may be provided with a plurality of power generation modules arranged in parallel and may produce power at every power generation module, thus constituting a high-capacity energy system.

The electric-power system 3 may include a power plant, a substation, a power line, etc. When the electric-power system 3 is in a normal state, it supplies power to the energy storage system 1 to provide the power which is to be supplied to the load 4 and/or the battery system 20, and the electric-power system 3 is supplied with power from the energy storage system 1. On the other hand, when the electric-power system 3 is in an abnormal state, the supply of power from the electric-power system 3 to the energy storage system 1 is stopped, and the supply of power from the energy storage system 1 to the electric-power system 3 is likewise stopped.

The load 4 consumes power produced from the power generation system 2, power stored in the battery system 20, and/or power supplied from the electric-power system 3. A home, factory, or the like may be an example of the load 4.

The energy storage system 1 includes the battery system 20 configured to store power, and a power conversion system 10 configured to properly convert the power from the battery system 20, the power generation system 2, and the electric-power system 3 and then supply the converted power to the load 4.

The energy storage system 1 may store power, produced from the power generation system 2, in the battery system 20, and may supply the produced power to the electric-power system 3. The energy storage system 1 may supply power stored in the battery system 20 to the electric-power system 3, or may store power, supplied from the electric-power system 3, in the battery system 20. When the electric-power system 3 is in an abnormal state, for example, a power failure occurs, the energy storage system 1 performs the UPS operation to supply power to the load 4. Even when the electric-power system 3 is in a normal state, the energy storage system 1 may supply power produced from the power generation system 2 or power stored in the battery system 20 to the load 4.

Further, when the frequency is changed depending on a change in consumption of power flowing in the electric-power system 3, the energy storage system 1 may perform frequency regulation to maintain a desired frequency by charging or discharging power stored in the battery system 20, thus allowing a frequency to be kept constant or substantially constant. That is, for the purpose of regulating the frequency, when the frequency of power flowing in the electric-power system is high, the energy storage system 1 may supply power, produced from the power generation system 2, to the battery system 20. On the other hand, when the frequency is low, the energy storage system 1 may discharge the power stored in the battery system 20 and then supply it to the electric-power system 3.

Figure 2:
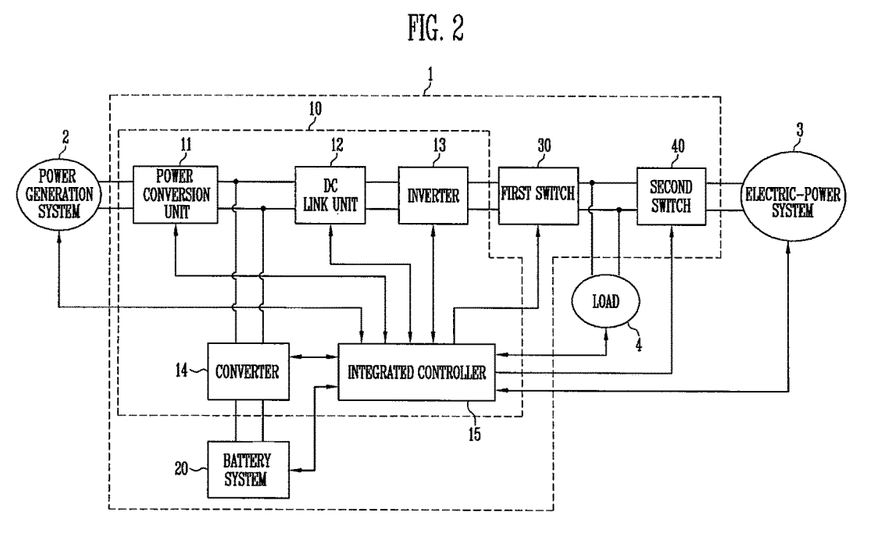
FIG. 2 is a block diagram showing the configuration of the energy storage system 1 according to an embodiment of the present invention.

FIG. 2 is a block diagram showing the configuration of the energy storage system 1 according to an embodiment of the present invention.

Referring to FIG. 2, the energy storage system 1 includes the power conversion system 10 configured to control power conversion, the battery system 20, a first switch 30, a second switch 40, and others.

The power conversion system 10 converts power supplied from the power generation system 2, the electric-power system 3, and the battery system 20 into a form suitable for the electric-power system 3, the load 4, and the battery system 20. The power conversion system 10 performs the conversion of power to an input/output terminal or the conversion of power from the input/output terminal. In this context, the power conversion may be DC/AC conversion and conversion between first and second voltages. The power conversion system 10 supplies converted power to a desired place depending on an operation mode under the control of an integrated controller 15. The power conversion system 10 may include a power conversion unit 11 (e.g., a power converter 11), a DC link unit 12 (a DC link 12), an inverter 13, a converter 14, and the integrated controller 15.

The power conversion unit 11 is a power conversion device that is connected (e.g., coupled) between the power generation system 2 and the DC link unit 12. The power conversion unit 11 is configured to transmit power, produced from the power generation system 2, to the DC link unit 12. An output voltage from the power conversion unit 11 is a DC link voltage.

The power conversion unit 11 may include a power conversion circuit, such as a converter or a rectifier circuit, depending on the kind of the power generation system 2. For example, if the power generation system 2 produces DC power, the power conversion unit 11 may include a converter for converting the voltage level of the DC power of the power generation system 2 into the voltage level of the DC power of the DC link unit 12. However, if the power generation system 2 produces AC power, the power conversion unit 11 may be a rectifier circuit for converting alternating current into direct current. For example, when the power generation system 2 is the solar-light power generation system, the power conversion unit 11 may include an MPPT converter that performs a maximum power point tracking control to maximally or increasedly obtain power produced from the power generation system 2 depending on several conditions such as a quantity of solar radiation and/or a temperature. The power conversion unit 11 may stop operating so as to minimize or reduce power consumption when no power is produced from the power generation system 2.

The DC link voltage may become unstable due to an instantaneous voltage drop of the power generation system 2 or the electric-power system 3, a sudden change in the load 4 or the requirement of high load. However, the DC link voltage should be stabilized to normally operate the converter 14 and the inverter 13. The DC link unit 12 is connected between the power conversion unit 11 and the inverter 13 to keep the DC link voltage constant or substantially constant. For example, a high-capacity capacitor may be included as the DC link unit 12.

The inverter 13 is a power conversion device that is connected between the DC link unit 12 and the first switch 30. The inverter 13 may include an inverter that converts DC output voltage from the DC link unit 12 into AC voltage of the electric-power system 3 in a discharge mode. Further, the inverter 13 may include a rectifier circuit that rectifies the AC voltage of the electric-power system 3, converts the AC voltage into the DC link voltage, and outputs the converted voltage so as to store the power of the electric-power system 3 in the battery system 20 in a charge mode. That is, the inverter 13 may be a bi-directional inverter that is changeable in input and output directions.

The inverter 13 may include a filter for removing harmonic waves from the AC voltage that is output to the electric-power system 3. Further, the inverter 13 may include a phase locked loop (PLL) circuit for synchronizing an AC voltage phase that is output from the inverter 13 with an AC voltage phase of the electric-power system 3 so as to suppress reactive power loss. Moreover, the inverter 13 may perform several functions, for example, restriction on a voltage fluctuation range, improvement on a power factor, removal of a DC component, and protection against transient phenomena. When the inverter 13 is not in use, it may stop operating so as to minimize or reduce power consumption.

The converter 14 is a power conversion device that is connected between the DC link unit 12 and the battery system 20. The converter 14 includes a DC-DC converter that converts the voltage of power output from the battery system 20 into the DC link voltage for the inverter 13 in the discharge mode. Further, the converter 14 may include a DC-DC converter that converts the voltage of power output from the power conversion unit 11 or the inverter 13 into the voltage for the battery system 20 in the charge mode. That is, the converter 14 may be a bi-directional converter that is changeable in input and output directions. When the converter 14 is not used to charge or discharge the battery system 20, the converter 14 may stop operating, thus minimizing or reducing power consumption.

The integrated controller 15 monitors the state of the power generation system 2, the electric-power system 3, the battery system 20 and the load 4, and controls the operation of the power conversion unit 11, the inverter 13, the converter 14, the battery system 20, the first switch 30, and the second switch 40 depending on the monitored result. The integrated controller 15 may monitor whether or not a power failure occurs in the electric-power system 3 and whether or not power is produced by the power generation system 2, and may monitor a production amount of the power if it is produced from the power generation system 2, the charging state of the battery system 20, the power consumption of the load 4, a time, etc. When power that is to be supplied to the load 4 is insufficient, for example, when a power failure occurs in the electric-power system 3, the integrated controller 15 may control the load 4 to determine the priority of power utilization devices included in the load 4, and supply power to a power utilization device having a high priority.

Further, according to an embodiment of the present invention, when the frequency is changed depending on a change in the consumption of power flowing in the electric-power system 3, the integrated controller 15 may perform frequency regulation for maintaining a desired frequency by charging or discharging power stored in the battery system 20, thus maintaining a constant or substantially constant frequency. That is, when the frequency of the power flowing in the electric-power system 3 for regulating the frequency is high, power produced from the power generation system 2 is supplied to the battery system 20. When the frequency is low, power stored in the battery system 20 may be discharged and supplied to the electric-power system 3.

To this end, the integrated controller 15 may transmit a control signal for regulating the frequency to the battery system 20. In this regard, the control signal may include a charge control signal causing the power to be charged into the battery system 20 when the frequency of the power flowing in the electric-power system 3 exceeds a value (e.g., a set value or a predetermined value), and a discharge control signal causing the power stored in the battery system 20 to be discharged, thus supplying the power to the electric-power system 3 when the frequency of the power flowing in the electric-power system 3 is less than the value (e.g., the set value or the predetermined value).

The operation of the battery system, in response to the control signal for regulating the frequency, will be described below in detail with reference to FIGS. 3 and 4.

Referring back to FIG. 2, the first switch 30 and the second switch 40 are connected between the inverter 13 and the electric-power system 3 in series, and perform an ON/OFF operation under the control of the integrated controller 15, thus controlling a current flow between the power generation system 2 and the electric-power system 3. The ON/OFF state of the first switch 30 and the second switch 40 may be determined depending on the state of the power generation system 2, the electric-power system 3 and the battery system 20.

To be more specific, in order to supply power from the power generation system 2 and/or the battery system 20 to the load 4 and to supply power from the electric-power system 3 to the battery system 20, the first switch 30 is turned on. In order to supply power from the power generation system 2 and/or the battery system 20 to the electric-power system 3 or to supply power from the electric-power system 3 to the load 4 and/or the battery system 20, the second switch 40 is turned on. As the first and second switches 30 and 40, it is possible to use a switching device such as a relay that may withstand a large magnitude of current.

When a power failure occurs in the electric-power system 3, the second switch 40 is turned off and the first switch 30 is turned on. That is, while power is supplied from the power generation system 2 and/or the battery system 20 to the load 4, the power supplied to the load 4 is prevented or substantially prevented from flowing towards the electric-power system 3. The energy storage system 1 is disconnected from the electric-power system 3 where a power failure occurs, thus preventing or substantially preventing power from being supplied to the electric-power system 3. Hence, this prevents or substantially prevents a worker who works on a power line or the like of the electric-power system 3, for example, a worker who repairs the power failure of the electric-power system 3, from getting shocked by the power from the energy storage system 1.

The battery system 20 is supplied with power from the power generation system 2 and/or the electric-power system 3 to store the power, and supplies the power stored in the battery system 20 to the load 4 or the electric-power system 3. The battery system 20 may include a power storing portion and a portion for controlling and protecting the power storing portion. Hereinafter, the battery system 20 will be described in detail with reference to FIG. 3.

Figure 3:
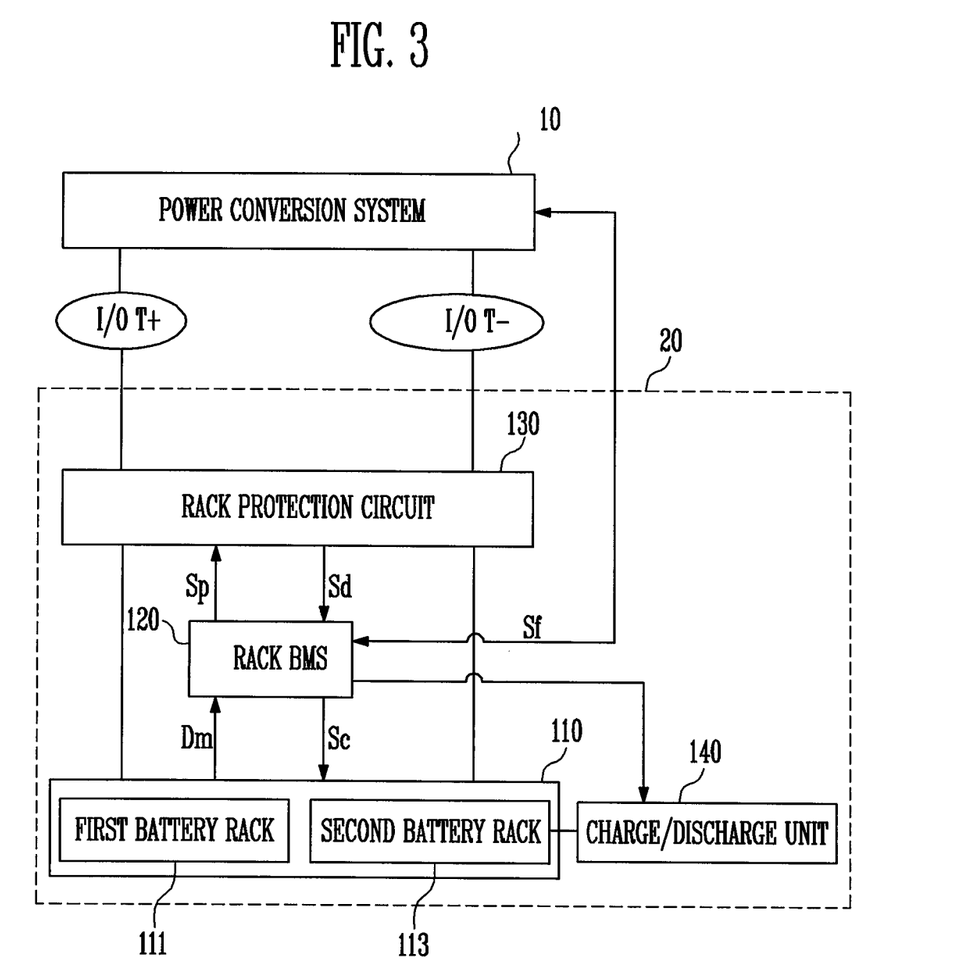
FIG. 3 is a diagram showing the configuration of a battery system according to an embodiment of the present invention.

FIG. 3 is a diagram showing the configuration of a battery system according to an embodiment of the present invention.

Referring to FIG. 3, the battery system 20 includes a battery rack 110, a rack battery management system (BMS) 120, a rack protection circuit 130, and a charge/discharge unit 140 (e.g., a charger/discharger 140).

The battery rack 110 stores power supplied from an outside, namely, the power generation system 2 and/or the electric-power system 3, and supplies the stored power to the load 4 and/or the electric-power system 3. The battery rack 110 may include one or more battery trays that are connected in series and/or in parallel to serve as a plurality of subunits. Further, each battery tray may include a plurality of battery cells as the subunits. Various secondary batteries that are rechargeable may be used for the battery cells. For example, the secondary battery used for the battery cell may include one or more batteries selected from a group including a nickel-cadmium battery, a lead storage battery, a nickel metal hydride battery (NiMH), a lithium ion battery, a lithium polymer battery, etc.

According to one embodiment of the present invention, the battery rack 110 may include a first battery rack 111 and a second battery rack 113. In this regard, the first battery rack 111 may include battery cells suitable for a low-speed operation, and the second battery rack 113 may include battery cells suitable for a high-speed operation. To this end, the discharge rate (e.g., the maximum rated discharge, or the maximum safe discharge rate) of the battery cells (e.g., the current rating of the battery cells) included in the second battery rack 113 may be larger than the discharge rate (e.g., the maximum rated discharge, or the maximum safe discharge rate) of the battery cells (e.g., the current rating of the battery cells) included in the first battery rack 111. That is, the second battery rack 113 may perform a charging/discharging operation at higher speeds in comparison to the first battery rack 111, and the state of charge of the second battery rack 113 may be rapidly controlled by a separate charge/discharge unit 140 that will be described below.

The rack BMS 120 is connected to the battery rack 110, and controls the charging/discharging operation of the battery rack 110 according to a control signal Sf transmitted from the integrated controller 15 of the power conversion system 10 to regulate a frequency. Further, the rack BMS 120 may perform an overcharge protection function, an over-discharge protection function, an overcurrent protection function, an overvoltage protection function, an overheat protection function, a cell balancing function, etc. To this end, the rack BMS 120 may receive one or more information or data such as, for example, monitoring data Dm on a voltage, a current, a temperature, a remaining power, a life span, a charging state, a state of charge (SOC), and others from the battery rack 110, and may produce a control signal Sp in response to the monitored result to control the rack protection circuit 130. Further, the rack BMS 120 performs control using the charge/discharge unit 140 such that the state of charge of the second battery rack has a constant or substantially constant value. Further, the rack BMS 120 may apply the received monitoring data Dm to the integrated controller 15 of the power conversion system 10, and may receive instructions on the control of the battery rack 110 from the integrated controller 15.

The rack protection circuit 130 is connected between input/output terminals (I/O T+, I/O T−) that are connected to the battery rack 110 and the converter 14 of the power conversion system 10, thus preventing or substantially preventing the battery rack 110 from being damaged. The rack protection circuit 130 may receive a control signal Sp from the rack BMS 120 to control the flow of current in response to the control signal Sp. Further, the rack protection circuit 130 may measure the output voltage or output current of the battery rack 110 and then transmit a measured signal Sd to the rack BMS 120. Here, the rack protection circuit 130 may be physically separated from the rack BMS 120. Thus, the rack BMS 120 is configured to be separated from the rack protection circuit 130 located on a high current path, thus allowing the rack BMS 120 to be protected from a high current.

The charge/discharge unit 140 performs the charging/discharging operation of the second battery rack 113. For example, the charge/discharge unit 140 may forcibly charge the second battery rack 113 using external power or may forcibly discharge the second battery rack 113 by connecting it to an external load, under the control of the rack BMS 120.

Figure 4:
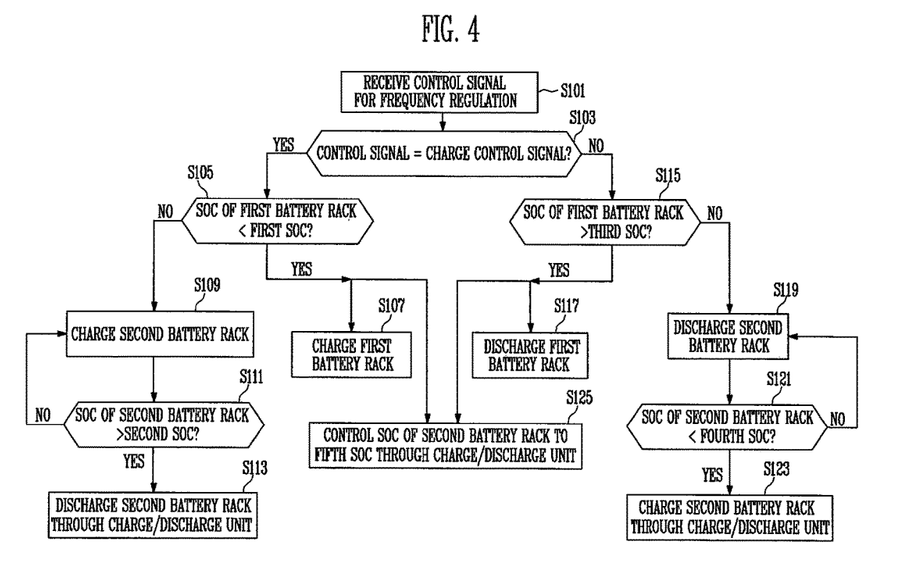
FIG. 4 is a flowchart showing a method of controlling the energy storage system for regulating a frequency according to an embodiment of the present invention.

FIG. 4 is a flowchart showing a method of controlling the energy storage system for regulating the frequency according to an embodiment of the present invention. The frequency regulating method of the battery system according to one embodiment of the present invention will be described below with reference to FIGS. 3 and 4.

First, the rack BMS 120 receives a control signal for controlling the frequency of power flowing in the electric-power system 3, from the power conversion system 10, at step S101.

In this regard, the control signal may include a charge control signal causing the power to be charged into the battery system 20 when the frequency of the power flowing in the electric-power system 3 exceeds a value (e.g., a set value or a predetermined value), and a discharge control signal causing the power stored in the battery system 20 to be discharged, thus supplying the power to the electric-power system 3 when the frequency of the power flowing in the electric-power system 3 is less than the value (e.g., the set value or the predetermined value).

Subsequently, the rack BMS 120 determines whether or not the control signal is the charge control signal or the discharge control signal, at step S103.

When the control signal is the charge control signal, the rack BMS 120 compares the state of charge of the first battery rack 111 with a first state of charge (e.g., a first preset state of charge) so as to determine the priority of charging the first battery rack 111 and the second battery rack 113, at step S105. The first state of charge (e.g., the first preset state of charge) is a value determining that the battery rack will come into the full charge state when a charging operation further proceeds because the state of charge of the first battery rack 111 is sufficiently high. This value (i.e., the first state of charge) may be predetermined through pre-experiments.

The rack BMS 120 performs control such that the first battery rack 111 is charged with power produced from the power generation system 2, or supplied by the electric-power system 3, when the state of charge of the first battery rack 111 is less than the first state of charge (e.g., the first preset state of charge), at step S107. In contrast, the rack BMS 120 performs control such that the second battery rack 113 is charged with power produced from the power generation system 2, or supplied by the electric-power system 3, when the state of charge of the first battery rack 111 is equal to or more than the first state of charge (e.g., the first preset state of charge), at step S109.

When the control is performed such that the second battery rack 113 is charged with power produced from the power generation system 2, the rack BMS 120 compares the state of charge of the second battery rack 113 with a second state of charge (e.g., a second preset state of charge), at step S111. The second state of charge is a value determining that the battery rack will come into the full charge state when a charging operation further proceeds because the state of charge of the second battery rack 113 is sufficiently high. This value (i.e., the second state of charge) may be predetermined through pre-experiments.

When the state of charge of the second battery rack 113 increases to exceed the second state of charge (e.g., the second preset state of charge), the rack BMS 120 forcibly discharges the second battery rack 113 using the charge/discharge unit 140 so that the state of charge of the second battery rack 113 maintains the second state of charge, at step S113. To this end, power discharged from the second battery rack 113 may be larger than power transmitted from the power generation system 2. That is, the battery cell constituting the second battery rack 113 may be a battery cell having a discharge rate high enough to perform a rapid charging/discharging operation.

According to an embodiment of the present invention, when the battery system 20 should be charged with power produced from the power generation system so as to regulate a frequency, first, the charging operation is performed using the first battery rack 111 suitable for the low-speed operation. When there is a risk that the first battery rack 111 will be fully charged, the charging operation is performed using the second battery rack 113 suitable for the high-speed operation. When there is a risk that the second battery rack 113 will be fully charged due to the charging operation, the second battery rack 113 is forcibly discharged by the separate charge/discharge unit 140, thus preventing or substantially preventing the second battery rack 113 from being fully charged. Consequently, the battery system 20 can continuously perform the charging operation for the frequency regulation without a stop resulting from the full charge.

Turning back to step S103, when the control signal is the discharge control signal, the rack BMS 120 compares the state of charge of the first battery rack 111 with a third state of charge (e.g., a third preset state of charge) so as to determine the priority of charging the first battery rack 111 and the second battery rack 113, at step S115. The third state of charge is a value determining that the battery rack will come into a full discharge state when a discharging operation further proceeds because the state of charge of the first battery rack 111 is sufficiently low. This value (i.e., the third state of charge) may be predetermined through pre-experiments.

When the state of charge of the first battery rack 111 exceeds the third state of charge, the rack BMS 120 performs control such that the first battery rack 111 is discharged, at step S117. In contrast, when the state of charge of the first battery rack 111 is equal to or less than the third state of charge, the rack BMS 120 performs control such that the second battery rack 113 is discharged, at step S119.

When the rack BMS 120 performs control such that the second battery rack 113 is discharged, the rack BMS 120 compares the state of charge of the second battery rack 113 with a fourth state of charge (e.g., a fourth preset state of charge), at step S121. The fourth state of charge is a value determining that the battery rack will come into the full discharge state when a discharging operation further proceeds because the state of charge of the second battery rack 113 is sufficiently low. This value (e.g., the fourth state of charge) may be predetermined through pre-experiments.

When the state of charge of the second battery rack 113 is less than the fourth state of charge, the rack BMS 120 forcibly charges the second battery rack 113 using the charge/discharge unit 140 such that the state of charge of the second battery rack 113 maintains the fourth state of charge, at step S123. To this end, power charged in the second battery rack 113 via the charge/discharge unit 140 may be larger than power discharged to regulate a frequency.

According to an embodiment of the present invention, when the battery system 20 should be discharged to regulate a frequency, first, the discharging operation is performed using the first battery rack 111 suitable for the low-speed operation. When there is a risk that the first battery rack 111 is fully discharged, the discharging operation is performed using the second battery rack 113 suitable for the high-speed operation. Further, when there is a risk that the second battery rack 113 is fully discharged due to the discharging operation, the second battery rack 113 is forcibly charged via a separate charge/discharge unit 140, thus preventing or substantially preventing the second battery rack 113 from being fully discharged. Consequently, the battery system 20 can continuously perform the discharging operation for the frequency regulation without a stop resulting from the full discharge.

When the first battery rack 111 is charged at step S107 or the first battery rack 111 is discharged at step S117, the rack BMS 120 performs control such that the state of charge of the second battery rack 113 is equal to (or substantially equal to) a fifth state of charge (e.g., a fifth preset state of charge) via the charge/discharge unit 140, at step S125.

In this context, the fifth state of charge may be about 50%. The rack BMS 120 controls the charge/discharge unit 140 such that the state of charge of the second battery rack 113 is about 50% when the first battery rack 111 is charged or discharged. In other words, by resetting the state of charge of the second battery rack 113 to about 50%, power can be charged into or discharged from the second battery rack 113 as much as possible (i.e., substantially the same amount of power can be charged into or discharged from the second battery rack 113).

Figure 5:
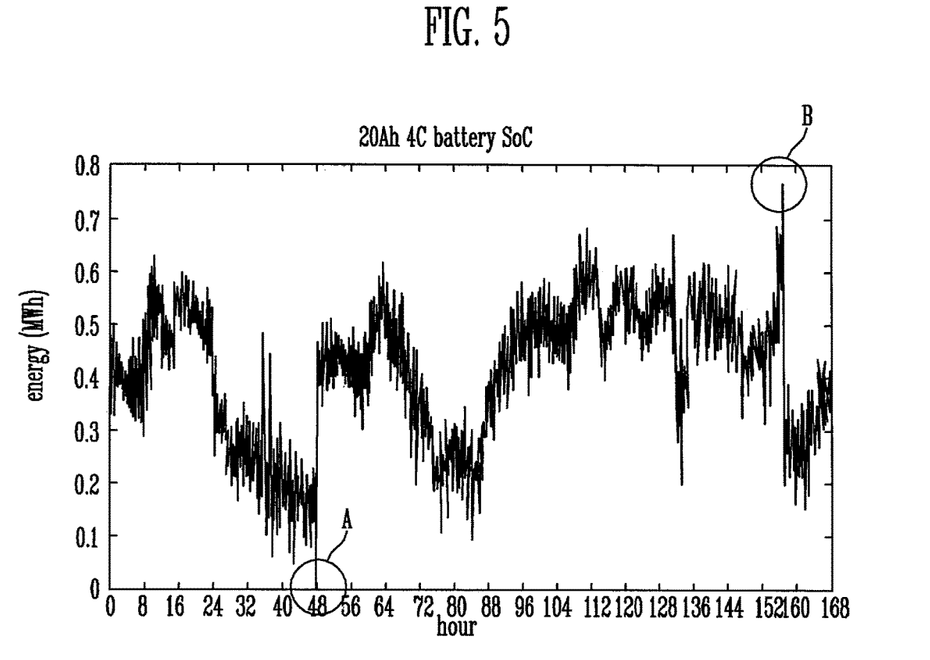
FIG. 5 is a graph showing a change in power of a battery rack when regulating a frequency using a single battery rack according to the related art.

FIG. 5 is a graph showing a change in power of a battery rack when regulating a frequency using a single battery rack according to the related art.

Referring to FIG. 5, it can be seen that the operation of readjusting the state of charge of the battery rack to about 50% occurs after the battery rack is fully discharged at point A due to the charging/discharging operation of the battery rack for regulating the frequency. Further, it can be seen that the operation of readjusting the state of charge of the battery rack to about 50% occurs after the battery rack is fully charged at point B.

Figure 6A:
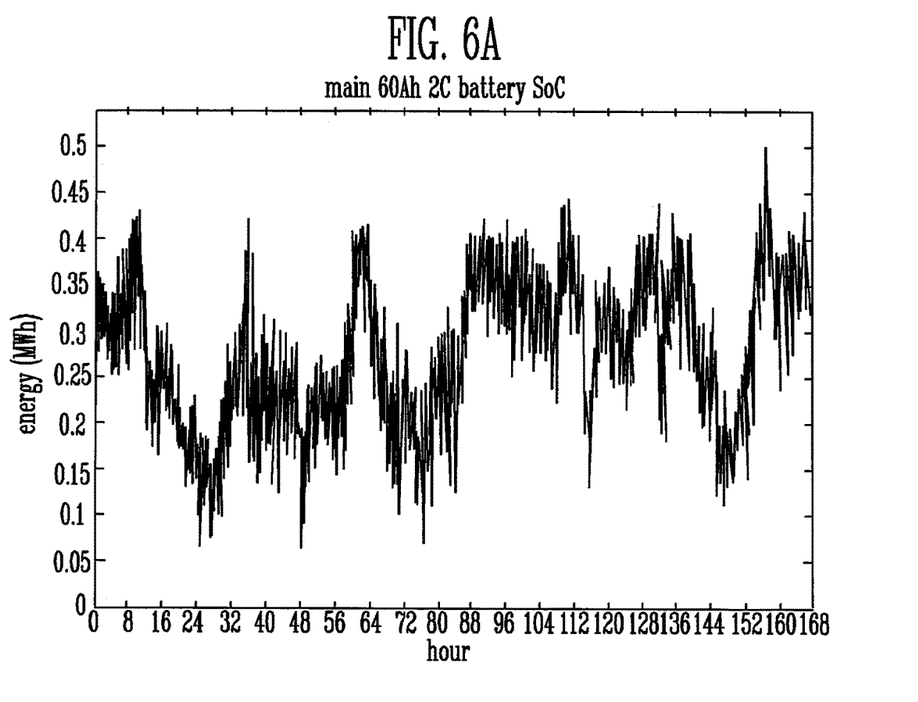
FIGS. 6A and 6B are graphs showing a change in power of first and second battery racks when regulating a frequency using the first and second battery racks, according to an embodiment of the present invention.
Figure 6B:
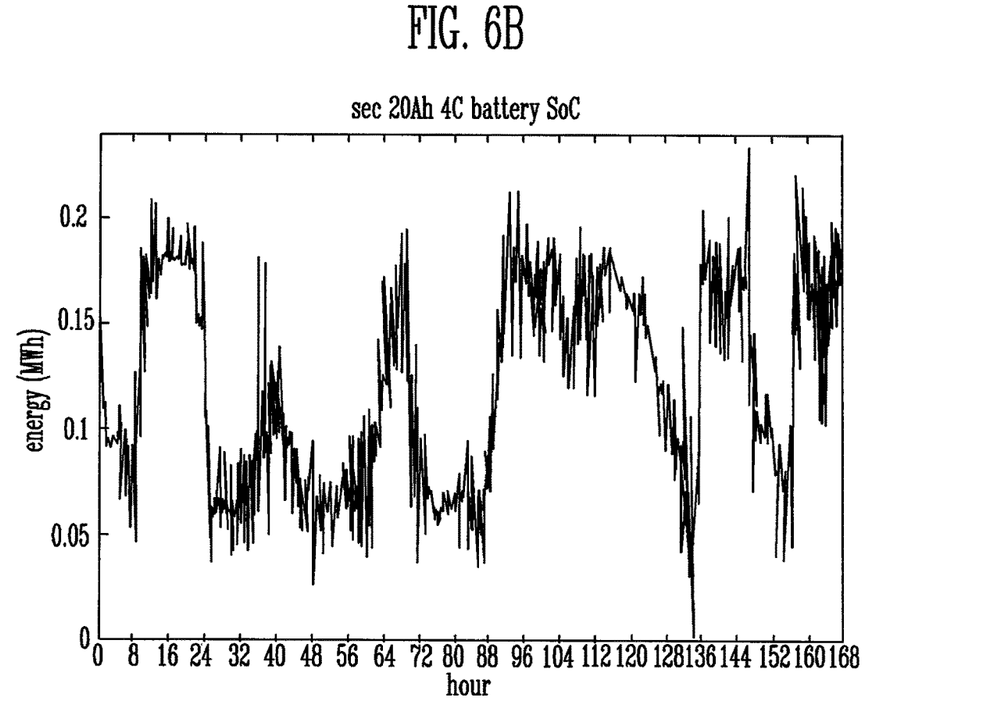

FIGS. 6A and 6B are graphs showing a change in power of the first and second battery racks when regulating a frequency using the first and second battery racks, according to an embodiment of the present invention.

Under the condition that the first battery rack has the discharge rate of 2 C and the capacity of 60 Ah, a test was performed. Further, under the condition that the second battery rack has the discharge rate of 4 C and the capacity of 20 Ah, a test was performed.

As shown in FIGS. 6A and 6B, as a result of the frequency regulation according to embodiments of the present invention using the first and second battery racks, no fully charged or discharged section occurs in either the first battery rack or the second battery rack. That is, according to one embodiment of the present invention, the determination of the priority of the first or second battery rack and the individual charging or discharging operation of the second battery rack enable frequency regulation to be continuously performed without a stop.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with any particular embodiment may be used singly or in combination with features, characteristics, and/or elements described in connection with any other suitable embodiments unless otherwise specifically indicated. Accordingly, it will be understood by those of skill in the art that various changes in form and details may be made without departing from the spirit and scope of the present invention as set forth in the following claims and their equivalents.

What is claimed is:

1. An energy storage system comprising:
   a power conversion system configured to produce a control signal for regulating a frequency of power flowing from a power generation system to an electric-power system; and a battery system comprising:
  a first battery rack;
  a second battery rack;
  a charger/discharger configured to perform a charging/discharging operation of the second battery rack;
  a rack battery management system (BMS) configured to control the charging/discharging operation of the first and second battery racks using the control signal, and to control the charger/discharger, thus controlling a state of charge (SOC) of the second battery rack;
  a first pair of terminals for concurrently charging or discharging the first battery rack and the second battery rack; and
  a second pair of terminals for charging or discharging only the second battery rack,
wherein, when the first battery rack is charged or discharged in response to the control signal, the rack BMS is configured to control the charger/discharger to cease charging or discharging operations such that the state of charge of the second battery rack remains at a fifth state of charge,
wherein the fifth state of charge is a value such that a maximum amount of power is able to be both charged into, or discharged from, the second battery rack, such that the same amount of power is able to be either charged into or discharged from the second battery rack.

2. The energy storage system of claim 1, wherein the control signal comprises:
  a charge control signal causing the power to be charged into the first or second battery rack when the frequency of the power flowing in the electric-power system exceeds a set value; and
  a discharge control signal causing the first or second battery rack to be discharged, thus supplying power to the electric-power system, when the frequency of the power flowing in the electric-power system is less than the set value.

3. The energy storage system of claim 2,
wherein, when the control signal is the charge control signal, the rack BMS performs control such that the power is charged into the first battery rack when a state of charge of the first battery rack is less than a first state of charge, and performs control such that the power is charged into the second battery rack when the state of charge of the first battery rack is equal to or more than the first state of charge, and
wherein the first state of charge is a value for determining that the first battery rack will come into a full charge state when a charging operation further proceeds.

4. The energy storage system of claim 3,
wherein, when the state of charge of the second battery rack increases to exceed a second state of charge and the power is being charged into the second battery rack, the rack BMS controls the charger/discharger to discharge the second battery rack such that the state of charge of the second battery rack maintains the second state of charge, and
wherein the second state of charge is a value for determining that the second battery rack will come into a full charge state when a charging operation further proceeds.

5. The energy storage system of claim 3, wherein the fifth state of charge is about 50%.

6. The energy storage system of claim 2,
wherein, when the control signal is the discharge control signal, the rack BMS performs control such that the first battery rack is discharged when a state of charge of the first battery rack is more than a third state of charge, and performs control such that the second battery rack is discharged when the state of charge of the first battery rack is equal to or less than the third state of charge, and
wherein the third state of charge is a value for determining that the first battery rack will come into a full discharge state when a discharging operation further proceeds.

7. The energy storage system of claim 6,
wherein, when the state of charge of the second battery rack is less than a fourth state of charge and the second battery rack is being discharged, the rack BMS controls the charger/discharger to charge the second battery rack such that the state of charge of the second battery rack maintains the fourth state of charge, and
wherein the fourth state of charge is a value for determining that the second battery rack will come into a full discharge state when a discharging operation further proceeds.

8. The energy storage system of claim 6, wherein the fifth state of charge is 50%.

9. The energy storage system of claim 1, wherein a maximum rated discharge of the second battery rack is larger than a maximum rated discharge of the first battery rack.

10. A method of controlling an energy storage system, the energy storage system comprising: a battery system comprising: a first battery rack; a second battery rack; a charger/discharger configured to charge or discharge the second battery rack; and a power conversion system configured to transmit a control signal for regulating a frequency of power flowing from a power generation system to an electric-power system, the method comprising:
  determining a priority of charging/discharging the first battery rack or the second battery rack using the control signal and a state of charge of the first battery rack;
  charging/discharging the first battery rack or the second battery rack to regulate the frequency depending on the determined priority;
  controlling a state of charge of the second battery rack to be a set state of charge using the charger/discharger; and
  controlling the charger/discharger with a rack battery management system (BMS) to cease charging or discharging operations when the first battery rack is charged or discharged in response to the control signal such that the state of charge of the second battery rack remains at a fifth state of charge,
wherein the fifth state of charge is a value such that a maximum amount of power is able to be both charged into, or discharged from, the second battery rack, such that the same amount of power is able to be either charged into or discharged from the second battery rack; and
wherein the charger/discharger is configured to charge or discharge the first battery rack and the second battery rack concurrently, and is configured to charge or discharge the second battery rack independently from the first battery rack.

11. The method of claim 10, wherein the control signal comprises:
  a charge control signal causing the power to be charged into the first or second battery rack when the frequency of the power flowing in the electric-power system exceeds a set value; and a discharge control signal causing the first or second battery rack to be discharged, thus supplying power to the electric-power system when the frequency of the power flowing in the electric-power system is less than the set value.

12. The method of claim 11, wherein, when the control signal is the charge control signal, at the determining of the priority, the priority is determined such that:
   when the state of charge of the first battery rack is less than a first state of charge, the power is charged into the first battery rack, and
   when the state of charge of the first battery rack is equal to or more than the first state of charge, the power is charged into the second battery rack, and
   wherein the first state of charge is a value for determining that the first battery rack will come into a full charge state when a charging operation further proceeds.

13. The method of claim 12,
   wherein, when a state of charge of the second battery rack exceeds a second state of charge,
      at the controlling of the state of charge of the second battery rack, the charger/discharger is controlled such that the second battery rack is discharged and the state of charge of the second battery rack maintains the second state of charge, and
   wherein the second state of charge is a value for determining that the second battery rack will come into a full charge state when a charging operation further proceeds.

14. The method of claim 11,
   wherein, when the control signal is the discharge control signal,
      at the determining of the priority, the priority is determined such that:
         when the state of charge of the first battery rack is more than a third state of charge, the first battery rack is discharged, and
         when the state of charge of the first battery rack is equal to or less than the third state of charge, the second battery rack is discharged, and
      wherein the third state of charge is a value for determining that the first battery rack will come into a full discharge state when a discharging operation further proceeds.

15. The method of claim 14, wherein, when a state of charge of the second battery rack is less than a fourth state of charge, at the controlling of the state of charge of the second battery rack, the charger/discharger is controlled such that the second battery rack is charged and the state of charge of the second battery rack maintains the fourth state of charge, and
   wherein the fourth state of charge is a value for determining that the second battery rack will come into a full discharge state when a discharging operation further proceeds.

16. The method of claim 15, wherein the fifth state of charge is 50%.

17. The method of claim 10, wherein a maximum rated discharge of the second battery rack is larger than a maximum rated discharge of the first battery rack.

18. The energy storage system of claim 1, wherein the rack BMS is otherwise configured to control the charger/discharger such that the state of charge of the second battery rack has either a second state of charge or a fourth state of charge.

19. The method of claim 10, wherein the rack BMS is otherwise configured to control the charger/discharger such that the state of charge of the second battery rack has either a second state of charge or a fourth state of charge.

* * * * *